(12) United States Patent
Yamamoto et al.

(10) Patent No.: US 7,126,883 B2
(45) Date of Patent: Oct. 24, 2006

(54) OPTICAL INFORMATION REPRODUCING METHOD, OPTICAL HEAD DEVICE, AND OPTICAL INFORMATION PROCESSOR

(75) Inventors: Hiroaki Yamamoto, Kawabe-gun (JP); Teruhiro Shiono, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 309 days.

(21) Appl. No.: 10/498,389

(22) PCT Filed: Oct. 9, 2002

(86) PCT No.: PCT/JP02/10508

§ 371 (c)(1),
(2), (4) Date: Jun. 10, 2004

(87) PCT Pub. No.: WO03/052756

PCT Pub. Date: Jun. 26, 2003

(65) Prior Publication Data
US 2005/0041558 A1    Feb. 24, 2005

(30) Foreign Application Priority Data
Dec. 14, 2001 (JP) ............................. 2001-381333

(51) Int. Cl.
*G11B 7/00* (2006.01)

(52) U.S. Cl. .................. 369/13.06; 369/13.05; 369/112.05; 369/110.01; 369/47.1

(58) Field of Classification Search .............. None
See application file for complete search history.

(56) References Cited

U.S. PATENT DOCUMENTS

| 5,153,873 | A | 10/1992 | Spruit et al. |
| 5,577,017 | A | 11/1996 | Yamamoto et al. |
| 6,014,359 | A | 1/2000 | Nagano |
| 6,477,118 | B1* | 11/2002 | Awano et al. ............ 369/13.14 |
| 6,661,745 | B1 | 12/2003 | Tominaga et al. |
| 2002/0048226 | A1* | 4/2002 | Kawaguchi et al. ..... 369/13.08 |

FOREIGN PATENT DOCUMENTS

| JP | 2-193347 | 7/1990 |
| JP | 4-44650 | 2/1992 |
| JP | 6-111330 | 4/1994 |
| JP | 9-245366 | 9/1997 |
| JP | 2000-149258 | 5/2000 |
| JP | 2000-348377 | 12/2000 |
| JP | 2001-229541 | 8/2001 |

* cited by examiner

*Primary Examiner*—Muhammad Edun
(74) *Attorney, Agent, or Firm*—Hamre, Schumann, Mueller & Larson, P.C.

(57) ABSTRACT

An optical information reproducing method of the present invention is used for an optical recording medium. The optical recording medium includes a recording layer containing information and a mask layer that is located close to the recording layer and includes a nonlinear optical material whose optical properties are changed in accordance with incident light intensity. The method includes irradiating the optical recording medium with convergent light that is polarized in a first direction and dividing reflected light from the optical recording medium into a first polarized component that is polarized in the first direction and a second polarized component that is polarized in a second direction perpendicular to the first direction. The second polarized component is used to detect a reproduction signal.

14 Claims, 8 Drawing Sheets

OPTICAL INFORMATION REPRODUCING METHOD, OPTICAL HEAD DEVICE, AND OPTICAL INFORMATION PROCESSOR

TECHNICAL FIELD

The present invention relates to an optical information reproducing method, an optical head device, and an optical information processing apparatus for optically reproducing information from optical disks or optical cards.

BACKGROUND ART

In recent years, with the advance of the information society, there has been a growing demand for a large-capacity external storage. For optical information recording, an increase in density by reducing the size of recording pits has been restricted due to a diffraction limit that depends on the wavelength of light and the numerical aperture of an objective lens.

Therefore, a so-called super-resolution recording/reproducing technology that enables readout of a recording mark smaller than a focusing spot diameter has been proposed as a means for achieving higher density. For example, JP 2000-348377 discloses a technique that uses near-field light to perform recording/reproduction beyond the diffraction limit of light.

Figure 8:
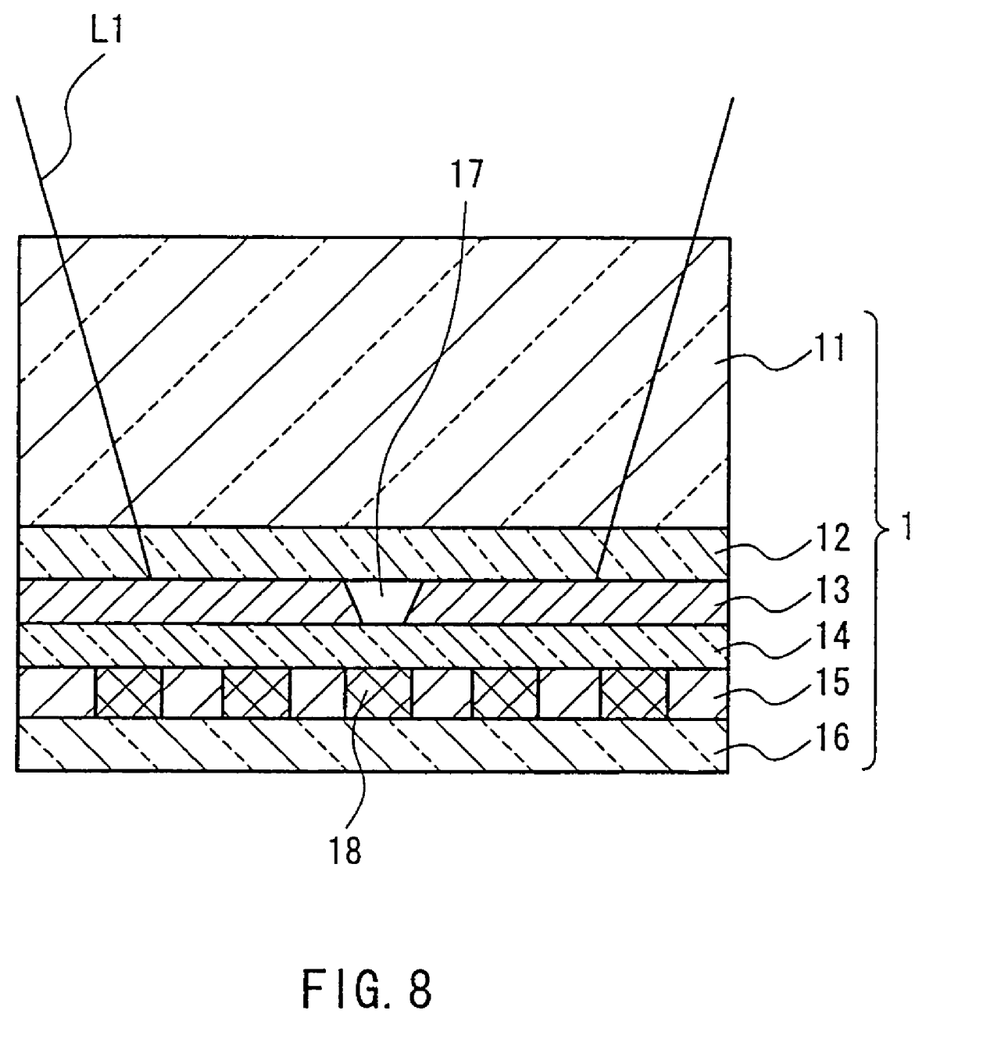
FIG. 8 is a cross-sectional view showing how to perform super-resolution recording/reproduction with respect to an optical recording medium.

FIG. 8 shows the cross-sectional configuration of an optical recording medium used in super-resolution recording/reproduction. This optical recording medium 1 includes a transparent substrate 11 and a first protective layer 12, a mask layer 13, a second protective layer 14, a recording layer 15, and a third protective layer 16 that are formed on the transparent substrate 11 in the indicated order. The first to third protective layers 12, 14, and 16 are made of $ZnS$—$SiO_2$. The recording layer 15 is made of a phase change material (e.g., a multinary compound such as GeSbTe). The mask layer 13 is made of silver oxide that is decomposed into oxygen and silver by heat. When the optical recording medium 1 is irradiated with convergent light L1, a focusing spot is formed in the mask layer 13, and then the silver oxide is decomposed into oxygen and silver to change the refractive index in a high-temperature portion of the focusing spot where the temperature exceeds a given threshold value. Thus, an aperture 17 smaller than the focusing spot diameter is formed in the mask layer 13 as a refractive index changing region. It is possible to write a recording mark 18 into the recording layer 15 or read the recording mark 18 from the recording layer 15 using near-field light generated at the aperture 17. The recording layer 15 is located at the position where the near-field light generated in the mask layer 13 can reach, thereby achieving both high-speed writing and high-speed reading.

Figure 9:
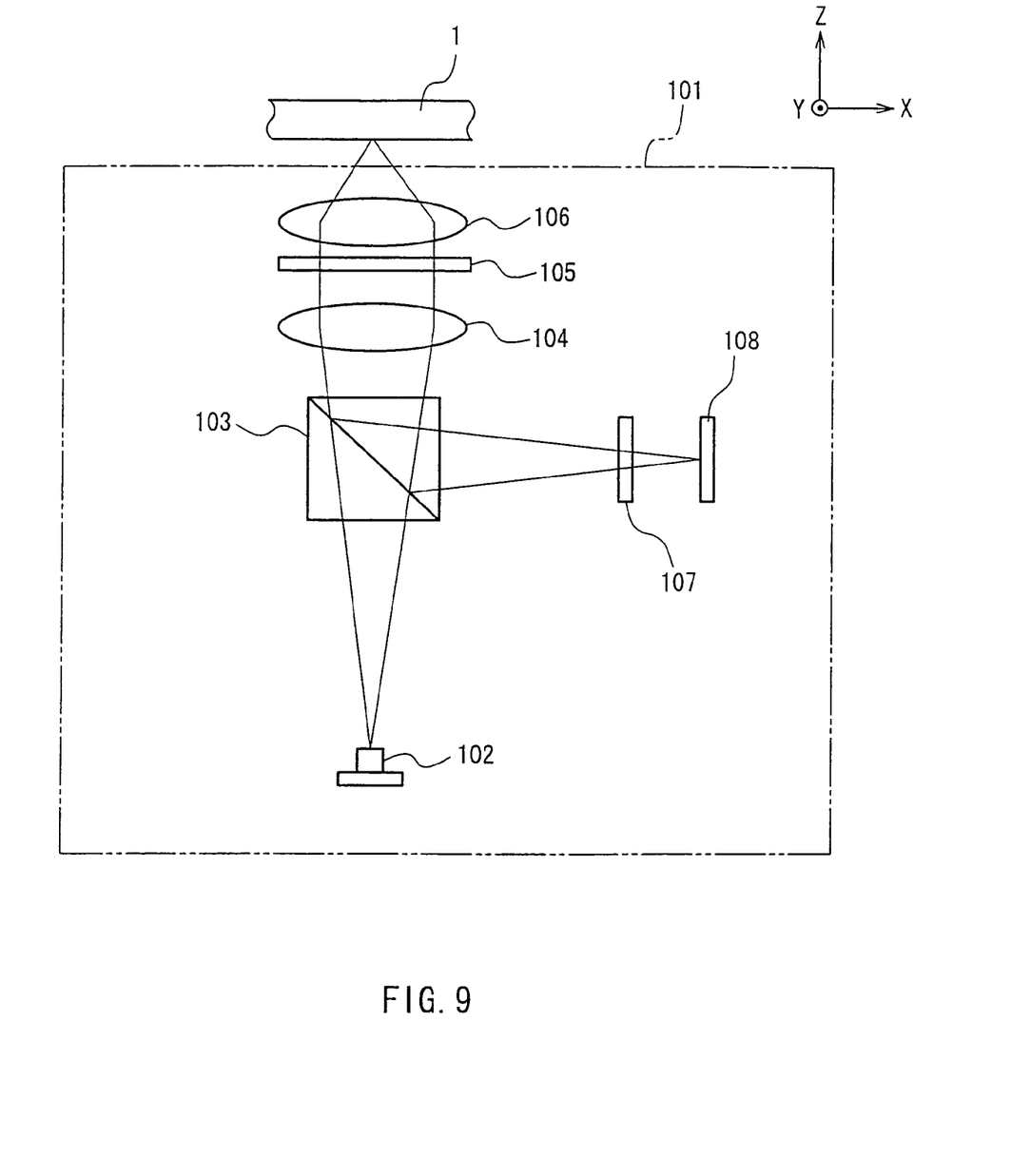
FIG. 9 is a schematic diagram showing the configuration of a conventional optical head device.

A general optical head device has been used in the above super-resolution recording/reproduction. FIG. 9 shows a general optical head device 101 when used for reproducing information from the optical recording medium 1. For convenience, the lateral direction of the sheet of this drawing is identified as an X-direction, the vertical direction from the sheet surface is identified as a Y-direction, and the longitudinal direction of the sheet is identified as a Z-direction.

A semiconductor laser 102 (a radiation light source) radiates linearly polarized light that is polarized in the X-direction. The light emitted from the semiconductor laser 102 enters a polarization beam splitter 103. The polarization beam splitter 103 has the functions of transmitting all the light polarized in the X-direction and reflecting all the light polarized in the Y-direction. The light passing through the polarization beam splitter 103 is converted into parallel light by a collimator lens 104, then converted into circularly polarized light by a quarter-wave plate 105, and focused to the inside of the optical recording medium 1 by an objective lens 106. The light reflected from the optical recording medium 1 again passes through the objective lens 106 and the quarter-wave plate 105, and thus is converted into linearly polarized light that is polarized in the Y-direction. This linearly polarized light further passes through the collimator lens 104 and enters the polarization beam splitter 103. The light entering the polarization beam splitter 103 is polarized in the Y-direction, and therefore is reflected by the polarization beam splitter 103. The reflected light passes through a cylindrical lens 107 or the like so that the wavefront is controlled to detect a servo signal. Subsequently, a photodetector 108 detects a reproduction signal and a servo signal. The quarter-wave plate 105 and the polarization beam splitter 103 are used to improve the light utilization efficiency. Even if the quarter-wave plate 105 is not provided, and the polarization beam splitter 103 is replaced with a non-polarization beam splitter, information can be recorded/reproduced.

When optical information is reproduced in the above manner, a general laser beam includes a noise component. For normal reproduction (rather than the super-resolution reproduction), the noise component is not a problem because the degree of signal modulation is sufficient. In the case of super-resolution reproduction, however, a recording mark smaller than the spot diameter of the laser beam should be read, so that the degree of modulation of a reproduction signal is reduced significantly. Therefore, the effect of the noise component of the laser beam cannot be ignored, which may lead to S/N degradation.

DISCLOSURE OF INVENTION

An optical information reproducing method of the present invention is used for an optical recording medium. The optical recording medium includes a recording layer containing information and a mask layer that is located close to the recording layer and includes a nonlinear optical material whose optical properties are changed in accordance with incident light intensity. The method includes the following: irradiating the optical recording medium with convergent light that is polarized in a first direction; forming an optical property changing region in a portion of a region of the mask layer that is exposed to the convergent light; irradiating the recording layer with light passing through the optical property changing region; dividing reflected light from the optical recording medium into a first polarized component that is polarized in the first direction and a second polarized component that is polarized in a second direction perpendicular to the first direction; and detecting a reproduction signal by using the second polarized component.

An optical head device of the present invention is used for reproducing information from an optical recording medium. The optical recording medium includes a recording layer containing the information and a mask layer that is located close to the recording layer and includes a nonlinear optical material whose optical properties are changed in accordance with incident light intensity. The optical head device includes the following: a radiation light source for radiating light that is polarized in a first direction; a focusing optical system for converging the light emitted from the radiation light source on the optical recording medium to form a tiny spot; a polarization separation optical system for dividing reflected light from the optical recording medium into a first polarized component that is polarized in the first direction and a second polarized component that is polarized in a second direction perpendicular to the first direction; and a photodetector for detecting a reproduction signal by receiving the second polarized component separated by the polarization separation optical system.

An optical information processing apparatus of the present invention includes an optical recording medium and an optical head device. The optical recording medium includes a recording layer containing information and a mask layer that is located close to the recording layer and includes a nonlinear optical material whose optical properties are changed in accordance with incident light intensity. The optical head device includes the following: a radiation light source for radiating linearly polarized light that is polarized in a first direction; a focusing optical system for converging the light emitted from the radiation light source on the optical recording medium to form a tiny spot; a polarization separation optical system for dividing reflected light from the optical recording medium into a first polarized component that is polarized in the first direction and a second polarized component that is polarized in a second direction perpendicular to the first direction; and a photodetector for detecting a reproduction signal by receiving the second polarized component separated by the polarization separation optical system.

BEST MODE FOR CARRYING OUT THE INVENTION

An optical information reproducing method of the present invention is used for an optical recording medium. The optical recording medium includes a recording layer containing information and a mask layer that is located close to the recording layer and includes a nonlinear optical material whose optical properties are changed in accordance with incident light intensity. The method includes the following: irradiating the optical recording medium with convergent light that is polarized in a first direction; forming an optical property changing region in a portion of a region of the mask layer that is exposed to the convergent light; irradiating the recording layer with light passing through the optical property changing region; dividing reflected light from the optical recording medium into a first polarized component that is polarized in the first direction and a second polarized component that is polarized in a second direction perpendicular to the first direction; and detecting a reproduction signal by using the second polarized component. The reflected light from the optical recording medium used in the optical information reproducing method of the present invention includes light reflected from the recording layer and light reflected from the mask layer. The light reflected from the recording layer represents information (including reproduction information) recorded on the recording layer and has a high degree of modulation. The light reflected from the mask layer includes no reproduction information. There is a difference in polarization state between them. Specifically, the light reflected from the mask layer has the same polarization state as the convergent light for irradiation. In contrast, the light reflected from the recording layer is scattered in the optical property changing region of the mask layer, and also includes a polarized component perpendicular to the polarization direction of the convergent light. The optical information reproducing method of the present invention allows the component (the second polarized component), which is polarized in the direction (the second direction) perpendicular to the polarization direction (the first direction) of the irradiation light and is included in light that represents reproduction information and has a high degree of modulation, to be taken out of the reflected light from the optical recording medium and used to detect a reproduction signal. Thus, a reproduction signal with a high degree of modulation can be obtained, and S/N can be improved in super-resolution reproduction.

In the optical recording medium used in the optical information reproducing method of the present invention, the nonlinear optical material of the mask layer may be at least one selected from antimony (Sb), silver oxide, a semiconductor, chalcogenide glass, and a thermochromic material. As the semiconductor, e.g., a semiconductor including elements such as silicon (Si) and germanium (Ge) can be used. The thermochromic material is a material that reversibly changes in color with temperature.

In the optical information reproducing method of the present invention, it is desirable that a servo signal is detected by using the first polarized component that is separated from the reflected light from the optical recording medium.

An optical head device of the present invention is used for reproducing information from an optical recording medium. The optical recording medium includes a recording layer containing the information and a mask layer that is located close to the recording layer and includes a nonlinear optical material whose optical properties are changed in accordance with incident light intensity. The optical head device includes the following: a radiation light source for radiating light that is polarized in a first direction; a focusing optical system for converging the light emitted from the radiation light source on the optical recording medium to form a tiny spot; a polarization separation optical system for dividing reflected light from the optical recording medium into a first polarized component that is polarized in the first direction and a second polarized component that is polarized in a second direction perpendicular to the first direction; and a photodetector for detecting a reproduction signal by receiving the second polarized component separated by the polarization separation optical system. In this case, the reflected light from the optical recording medium includes light that represents information recorded on the recording layer and has a high degree of modulation (the light reflected from the recording layer) and light that includes no reproduction information (the light reflected from the mask layer), as described above. However, the optical head device of the present invention can separate only the light with a high degree of modulation from the reflected light of the optical recording medium and detect a reproduction signal. Thus, S/N can be improved in super-resolution reproduction.

The polarization separation optical system of the optical head device of the present invention may include, e.g., a polarization beam splitter that transmits all the first polarized component and reflects all the second polarized component or a polarization beam splitter that reflects all the first polarized component and transmits all the second polarized component. Alternatively, the polarization separation optical system may include either a diffraction element that diffracts all the first polarized component and transmits all the second polarized component or a polarizing prism that separates the first polarized component from the second polarized component.

It is desirable that the optical head device of the present invention further includes a servo signal photodetector that detects a servo signal by receiving the first polarized component separated by the polarization separation optical system.

An optical information processing apparatus of the present invention includes an optical recording medium and an optical head device. The optical recording medium includes a recording layer containing information and a mask layer that is located close to the recording layer and includes a nonlinear optical material whose optical properties are changed in accordance with incident light intensity. The optical head device includes the following: a radiation light source for radiating linearly polarized light that is polarized in a first direction; a focusing optical system for converging the light emitted from the radiation light source on the optical recording medium to form a tiny spot; a polarization separation optical system for dividing reflected light from the optical recording medium into a first polarized component that is polarized in the first direction and a second polarized component that is polarized in a second direction perpendicular to the first direction; and a photodetector for detecting a reproduction signal by receiving the second polarized component separated by the polarization separation optical system. The reflected light from the optical recording medium in the optical information processing apparatus of the present invention includes light that represents information recorded on the recording layer and has a high degree of modulation (the light reflected from the recording layer) and light that includes no reproduction information (the light reflected from the mask layer). However, the optical information processing apparatus of the present invention can separate only the light with a high degree of modulation from the reflected light of the optical recording medium and detect a reproduction signal. Thus, S/N can be improved in super-resolution reproduction.

In the optical information processing apparatus of the present invention, the nonlinear optical material of the mask layer of the optical recording medium may be at least one selected from Sb, silver oxide, a semiconductor, chalcogenide glass, and a thermochromic material. As the semiconductor, e.g., a semiconductor including elements such as Si and Ge can be used. The thermochromic material is a material that reversibly changes in color with temperature.

In the optical information processing apparatus of the present invention, the polarization separation optical system of the optical head device may include, e.g., a polarization beam splitter that transmits all the first polarized component and reflects all the second polarized component or a polarization beam splitter that reflects all the first polarized component and transmits all the second polarized component. Alternatively, the polarization separation optical system may include either a diffraction element that diffracts all the first polarized component and transmits all the second polarized component or a polarizing prism that separates the first polarized component from the second polarized component.

In the optical information processing apparatus of the present invention, it is desirable that the optical head device further includes a servo signal photodetector that detects a servo signal by receiving the first polarized component separated by the polarization separation optical system.

Hereinafter, embodiments of the present invention will be described with reference to the drawings.

Embodiment 1

Figure 1:
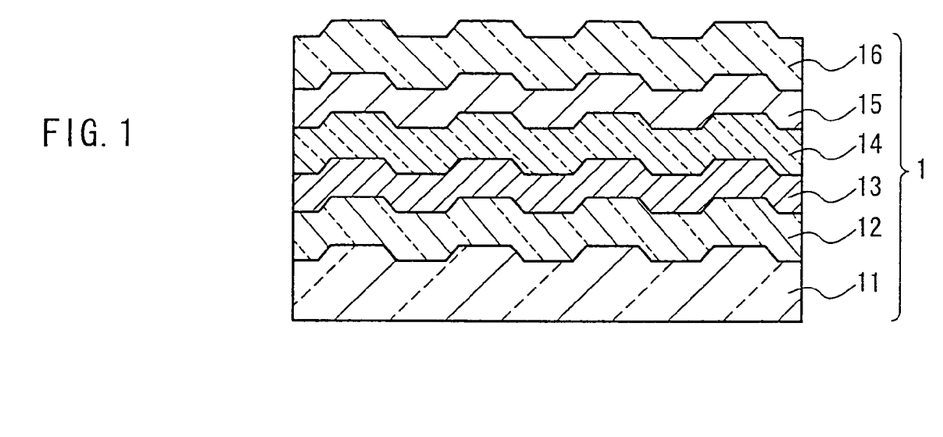
FIG. 1 is a cross-sectional view showing an example of the configuration of an optical recording medium used for super-resolution recording/reproduction.

First, the configuration of an optical recording medium in this embodiment will be described by referring to FIG. 1. An optical recording medium 1 of this embodiment includes a transparent substrate 11, a first protective layer 12, a mask layer 13, a second protective layer 14, a recording layer 15, and a third protective layer 16 in the indicated order from the incident side of a laser beam for recording/reproducing information.

The transparent substrate 11 is made of a material that is transparent or almost transparent to the laser beam, and transmits or substantially transmits the laser beam. Guide grooves for the laser beam preferably are formed in the surface of the transparent substrate 11. FIG. 1 shows the shape of the optical recording medium 1 provided with the guide grooves.

The mask layer 13 includes a nonlinear optical material whose optical properties are changed in accordance with incident light intensity. This embodiment uses a Sb film having a thickness of 20 nm.

The recording layer 15 is provided to record information and made of a material whose state is changed by light or heat generation resulting from the absorption of light. This embodiment uses a $Ge_{30}Sb_{15}Te_{55}$ film having a thickness of 15 nm.

The first to third protective layers 12, 14, and 16 are provided mainly to protect the mask layer 13 and the recording layer 15 and to adjust the optical properties so that the recording layer 13 can absorb light effectively. In this embodiment, a material obtained by mixing ZnS with 20 mol % of $SiO_2$ is used, and the thicknesses of the first, second, and third protective layers 12, 14, and 16 are 40 nm, 20 nm, and 130 nm, respectively.

Figure 2:
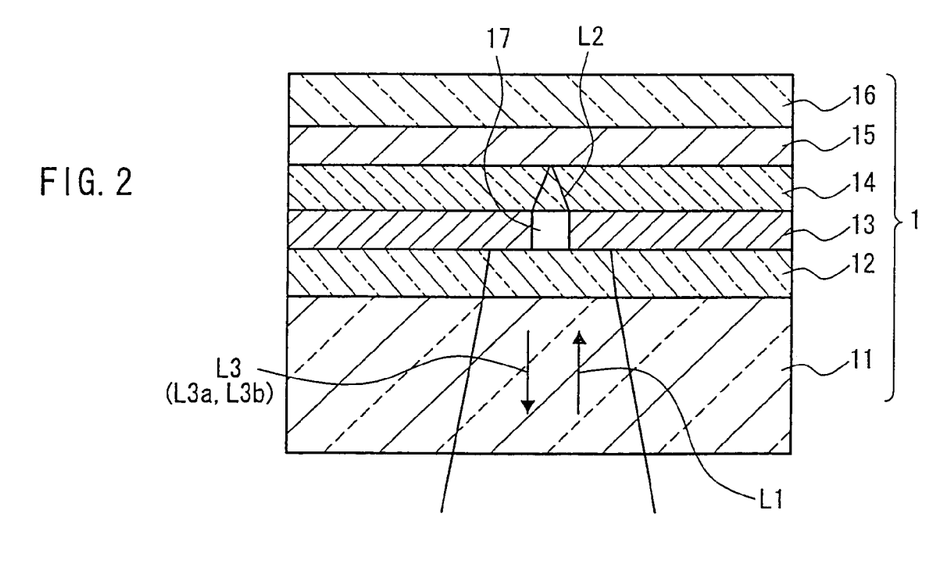
FIG. 2 is a cross-sectional view showing how to perform super-resolution recording/reproduction with respect to an optical recording medium.

Next, an optical information reproducing method in this embodiment will be described by referring to FIG. 2. To record/reproduce information with respect to the optical recording medium 1, the optical recording medium 1 is irradiated with a linearly polarized laser beam L1 that is convergent light focused by an objective lens (not shown). This irradiation light is diffracted by the aperture of the objective lens and has an intensity distribution with a shape close to Gaussian distribution in which the radius of a portion where the intensity is $1/e^2$ with respect to the central portion is 0.41 λ/NA (λ is the wavelength of a laser beam for irradiation, and NA is the numerical aperture of an objective lens).

In the Sb film (the mask layer 13), the temperature rises in the central portion of a region exposed to the laser beam L1, and the optical properties are changed. Consequently, a region (an optical property changing region) that changes in optical properties is formed in a portion of the region of the mask layer 13 that is exposed to the laser beam L1. In this portion, the light intensity of the laser beam L1 is larger than a predetermined value. The optical property changing region has a high transmittance with respect to the laser beam L1 and serves as an aperture 17. The size of the aperture 17 is smaller than the spot of the laser beam L1 falling on the mask layer 13.

By using a laser beam L2 that is transmitted through the aperture 17 thus formed in the mask layer 13, information is recorded on the recording layer 15 and the information is reproduced from the recording layer 15. The recordable/reproducible minimum mark size is determined by the size of the aperture 17 and independent of the diffraction limit. Accordingly, information of not more than the diffraction limit can be recorded/reproduced, i.e., so-called super-resolution recording/reproduction can be performed.

The information recorded on the recording layer 15 is reproduced by detecting reflected light L3 of the laser beam L1. The reflected light L3 includes a component of light in the central portion of the spot (i.e., a central light component) L3a (not shown) and a component of light on the periphery of the spot (i.e., a peripheral light component) L3b (not shown). The central light component L3a is light that represents the information recorded on the recording layer 15 and has a high degree of modulation. The peripheral light component L3b is light that is reflected from the mask layer 13 before reaching the recording layer 15 and includes no reproduction information. For this reason, when a reproduction signal is detected from the whole of the reflected light L3, the degree of signal modulation is reduced, and S/N is degraded.

Therefore, the optical information reproducing method of the present invention allows the central light component L3a to be taken out of the reflected light L3 and detected as a reproduction signal, thus performing favorable reproduction with an improved degree of signal modulation. In the optical information reproducing method of the present invention, a difference in polarization between the central light component L3a and the peripheral light component L3b is utilized to remove the peripheral light component L3b from the reflected light L3. Since the peripheral light component L3b is reflected from the mask layer 13, the polarization direction is the same as that of the laser beam L1. The central light component L3a is scattered while passing through the aperture 17, and also includes a polarized component perpendicular to the laser beam L1. Therefore, when the polarized component perpendicular to the laser beam L1 is taken out of the reflected light L3 and detected, a reproduction signal having a high degree of modulation can be obtained. This makes it possible to reduce the effect of noise and improve S/N.

Figure 3:
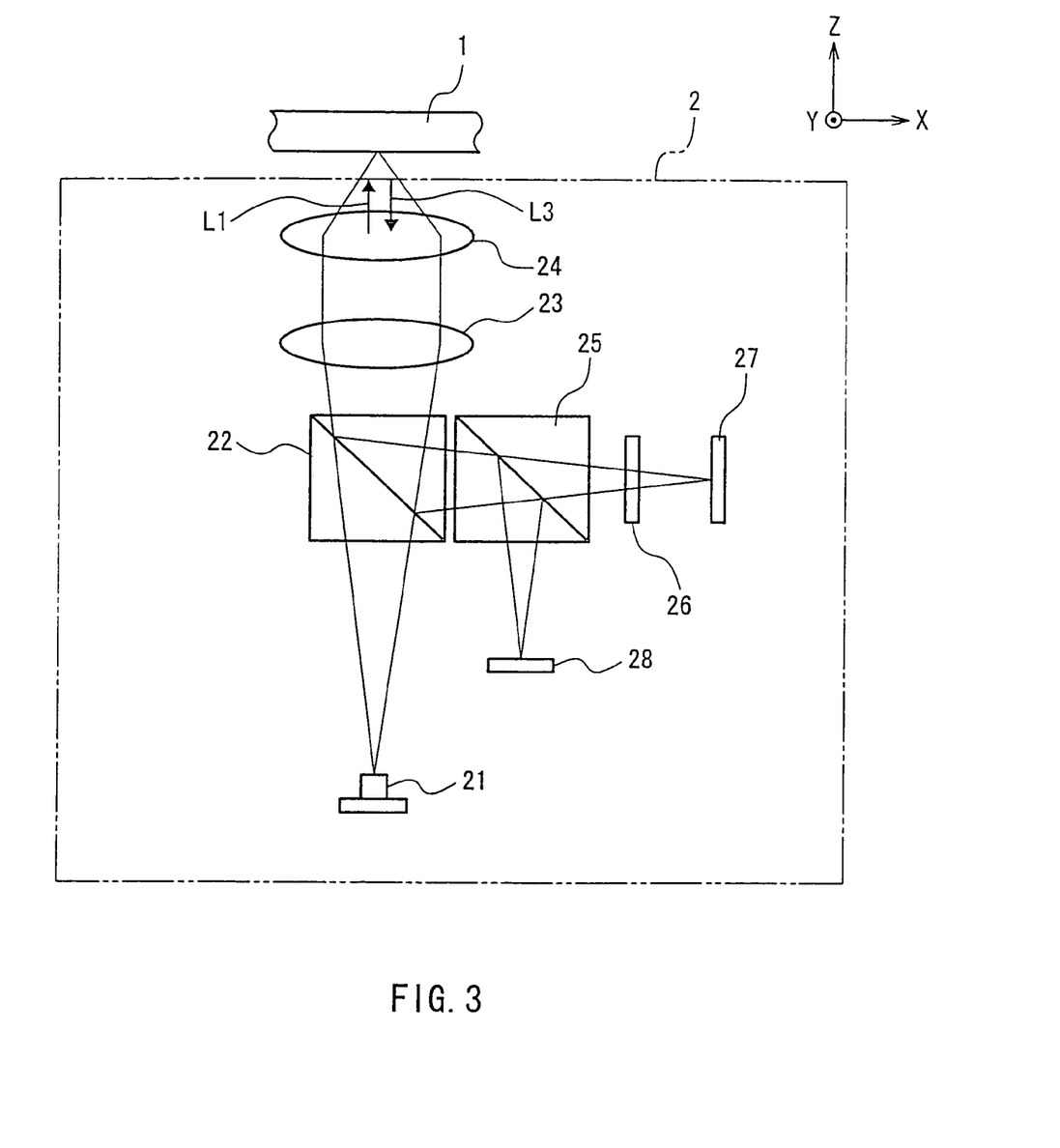
FIG. 3 is a schematic diagram showing the configuration of an optical head device in Embodiment 1 of the present invention.

Next, an example of an optical head device used in the optical information reproducing method of the present invention will be described. FIG. 3 shows an optical head device 2 of this embodiment when used for reproducing information from the optical recording medium 1. For convenience, the lateral direction of the sheet of this drawing is identified as an X-direction, the vertical direction from the sheet surface is identified as a Y-direction, and the longitudinal direction of the sheet is identified as a Z-direction.

A semiconductor laser 21 (a radiation light source) radiates linearly polarized light that is polarized in the X-direction (a first direction). A laser beam L1 emitted from the semiconductor laser 21 enters a polarization beam splitter 22. The polarization beam splitter 22 has the functions of dividing the light polarized in the X-direction into transmission and reflection at a desired ratio (e.g., a transmittance of 80% and a reflectance of 20% in this embodiment) and reflecting all the light polarized in the Y-direction (a second direction). The laser beam L1 passing through the polarization beam splitter 22 is converted into parallel light by a collimator lens 23 and focused to the inside of the optical recording medium 1 by an objective lens 24. The optical recording medium 1 has the structure as shown in FIGS. 1 and 2. Reflected light L3 that is reflected from the optical recording medium 1 again passes through the objective lens 24 and the collimator lens 23, and then enters the polarization beam splitter 22, where 20% of the light polarized in the X-direction is reflected and all the light polarized in the Y-direction is reflected. The light reflected from the polarization beam splitter 22 further enters a polarization beam splitter 25 that serves as a polarization separation optical system. The polarization beam splitter 25 has the functions of transmitting all the light polarized in the X-direction and reflecting all the light polarized in the Y-direction. Therefore, the polarization beam splitter 25 can separate the component (a first polarized component) that is polarized in the X-direction from the component (a second polarized component) that is polarized in the Y-direction.

A photodetector 28 receives the component polarized in the Y-direction and detects a reproduction signal. The light polarized in the X-direction that has passed through the polarization beam splitter 25 enters a hologram element 26, where the wavefront is transformed so as to detect a servo signal. Then, the light enters a photodetector 27 that serves as a servo signal photodetector. The photodetector 27 includes a plurality of light-receiving regions and can detect servo signals from the signals in each of the light-receiving regions.

As described above, the optical head device 2 of this embodiment can separate the component that represents recorded information from the reflected light and perform super-resolution reproduction with improved S/N.

In this embodiment, the polarization beam splitter that transmits all the light polarized in the X-direction and reflects all the light polarized in the Y-direction is used as a polarization separation optical system. Needless to say, it is also possible to use a polarization beam splitter that reflects all the light polarized in the X-direction and transmits all the light polarized in the Y-direction.

Embodiment 2

Figure 4:
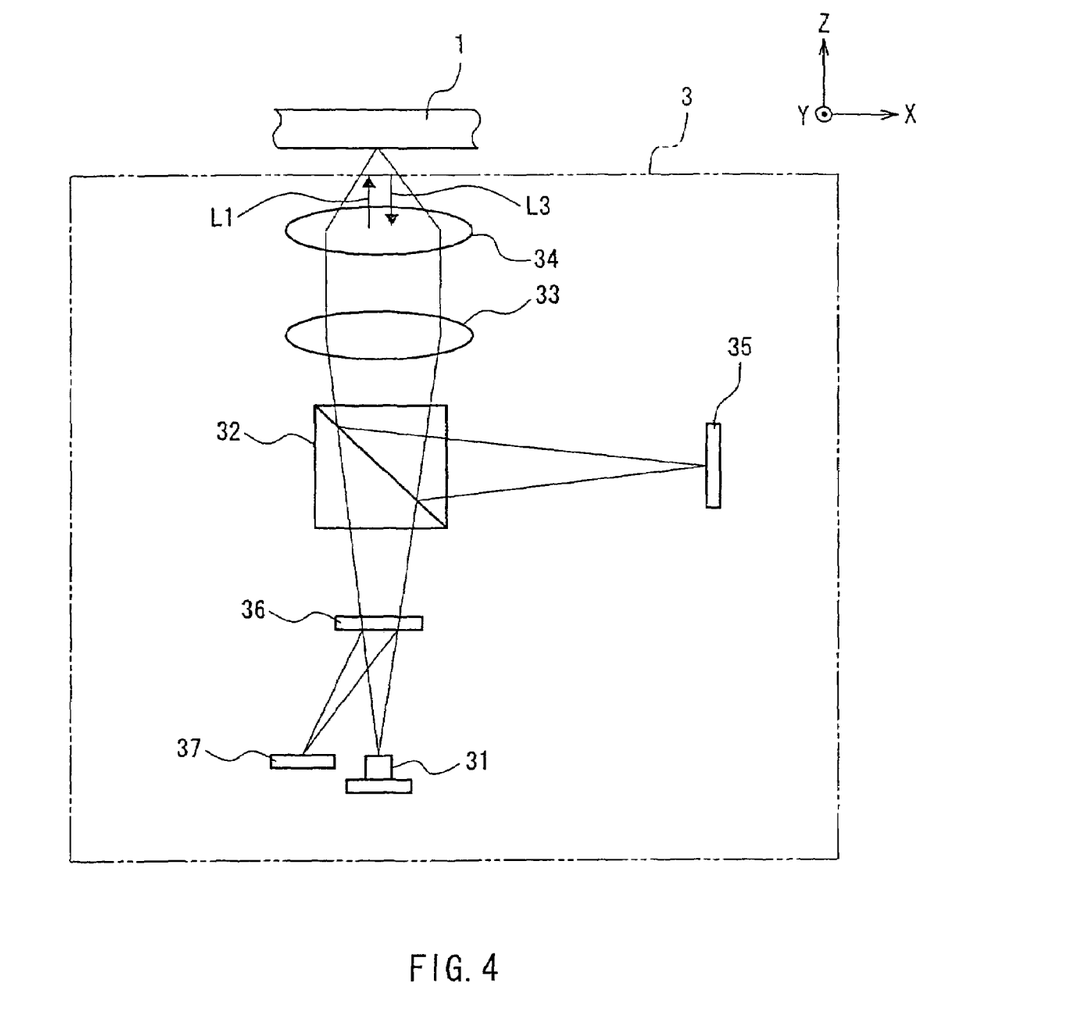
FIG. 4 is a schematic diagram showing the configuration of an optical head device in Embodiment 2 of the present invention.

The following is an explanation of another embodiment of an optical head device of the present invention. FIG. 4 shows an optical head device 3 of this embodiment when used for reproducing information from the optical recording medium 1. For convenience, the lateral direction of the sheet of this drawing is identified as an X-direction, the vertical direction from the sheet surface is identified as a Y-direction, and the longitudinal direction of the sheet is identified as a Z-direction.

A semiconductor laser 31 (a radiation light source) radiates linearly polarized light that is polarized in the X-direction (a first direction). A laser beam L1 emitted from the semiconductor laser 31 enters a polarization beam splitter 32. The polarization beam splitter 32 has the functions of transmitting all the light polarized in the X-direction and reflecting all the light polarized in the Y-direction (a second direction). The laser beam L1 passing through the polarization beam splitter 32 is converted into parallel light by a collimator lens 33 and focused to the inside of the optical recording medium 1 by an objective lens 34. The optical recording medium 1 has the structure as shown in FIGS. 1 and 2. Reflected light L3 that is reflected from the optical recording medium 1 again passes through the objective lens 34 and the collimator lens 33, and then enters the polarization beam splitter 32, where all the light polarized in the X-direction (a first polarized component) is transmitted and all the light polarized in the Y-direction (a second polarized component) is reflected. In other words, the polarization beam splitter 32 functions as a polarization separation optical system that separates the first polarized component and the second polarized component from the reflected light.

A photodetector 35 receives the component polarized in the Y-direction and detects a reproduction signal. The light polarized in the X-direction that has been separated by the polarization beam splitter 32 enters a hologram element 36, where the wavefront is transformed by diffraction of the hologram element 36 so as to detect a servo signal. Then, the light enters a photodetector 37 that serves as a servo signal photodetector. The photodetector 37 includes a plurality of light-receiving regions and can detect servo signals from the signals in each of the light-receiving regions. In this configuration, the semiconductor laser 31 can be located close to the photodetector 37 for detecting a servo signal, thus improving stability. Moreover, the semiconductor laser 31, the photodetector 37, and the hologram element 36 are integrated in the same package, so that the optical head device can have higher stability.

As described above, the optical head device 3 of this embodiment can separate the component that represents recorded information from the reflected light and perform super-resolution reproduction with improved S/N.

Embodiment 3

Figure 5:
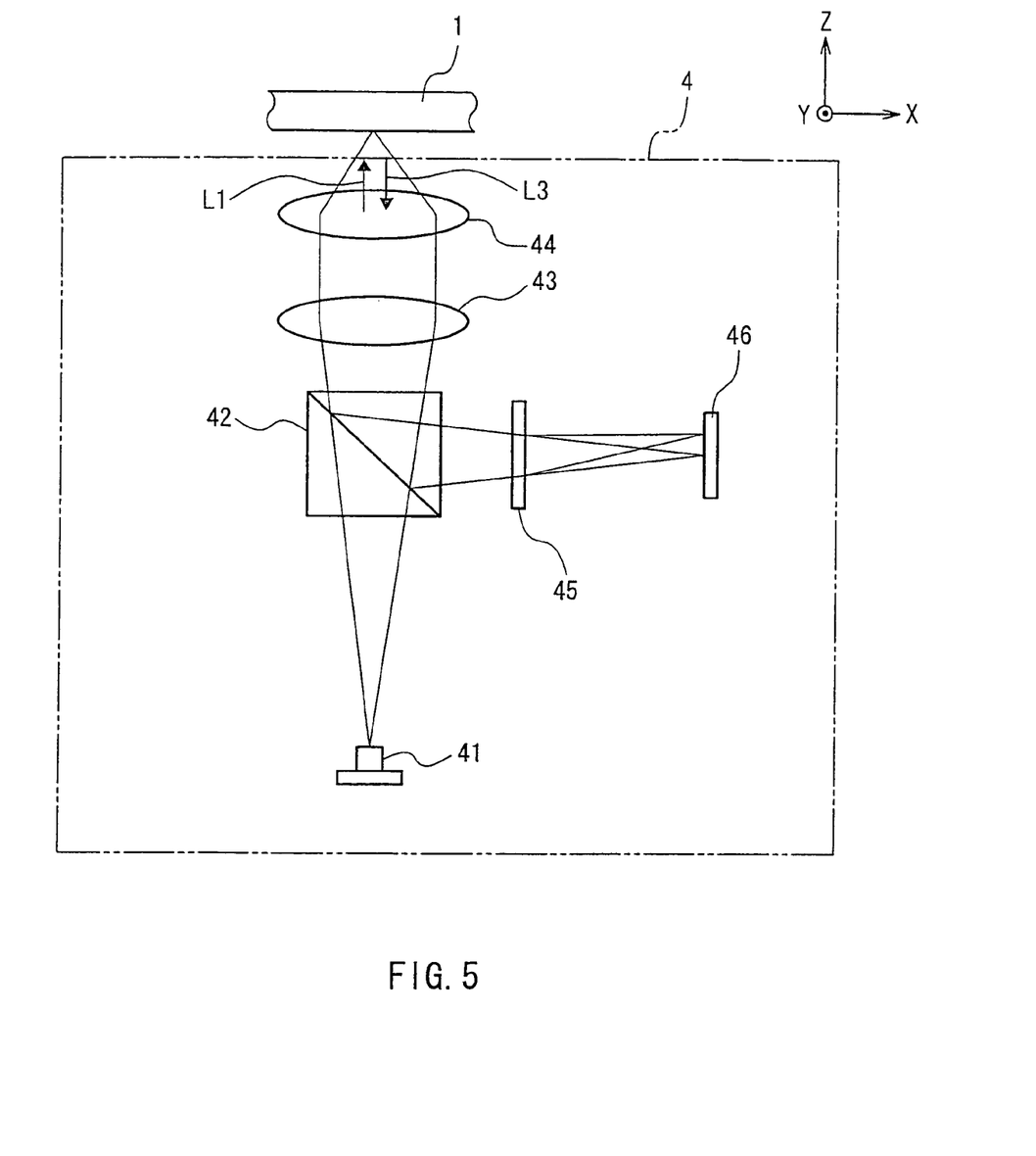
FIG. 5 is a schematic diagram showing the configuration of an optical head device in Embodiment 3 of the present invention.

The following is an explanation of another embodiment of an optical head device of the present invention. FIG. 5 shows an optical head device 4 of this embodiment when used for reproducing information from the optical recording medium 1. For convenience, the lateral direction of the sheet of this drawing is identified as an X-direction, the vertical direction from the sheet surface is identified as a Y-direction, and the longitudinal direction of the sheet is identified as a Z-direction.

A semiconductor laser 41 (a radiation light source) radiates linearly polarized light that is polarized in the X-direction (a first direction). A laser beam L1 emitted from the semiconductor laser 41 enters a polarization beam splitter 42. The polarization beam splitter 42 has the functions of dividing the light polarized in the X-direction into transmission and reflection at a desired ratio (e.g., a transmittance of 80% and a reflectance of 20% in this embodiment) and reflecting all the light polarized in the Y-direction (a second direction). The laser beam L1 passing through the polarization beam splitter 42 is converted into parallel light by a collimator lens 43 and focused to the inside of the optical recording medium 1 by an objective lens 44. The optical recording medium 1 has the structure as shown in FIGS. 1 and 2. Reflected light L3 that is reflected from the optical recording medium 1 again passes through the objective lens 44 and the collimator lens 43, and then enters the polarization beam splitter 42, where 20% of the light polarized in the X-direction is reflected and all the light polarized in the Y-direction is reflected. The light reflected from the polarization beam splitter 42 further enters a polarization anisotropic hologram 45 that serves as a polarization separation optical system. The polarization anisotropic hologram 45 is a diffraction element that diffracts the component polarized in the X-direction (a first polarized component) at a desired wavefront so as to detect a servo signal and transmits the component polarized in the Y-direction (a second polarized component). Therefore, the polarization anisotropic hologram 45 can separate the two polarized components.

The component polarized in the Y-direction that has been transmitted through the polarization anisotropic hologram 45 is detected in a light-receiving region of a photodetector 46 and converted into a reproduction signal. The component polarized in the X-direction that has been diffracted by the polarization anisotropic hologram 45 is detected in a plurality of light-receiving regions of the photodetector 46 and converted into servo signals. In this configuration, the photodetector 46 is used for a reproduction signal as well as a servo signal.

As described above, the optical head device 4 of this embodiment can separate the component that represents recorded information from the reflected light and perform super-resolution reproduction with improved S/N.

Embodiment 4

Figure 6:
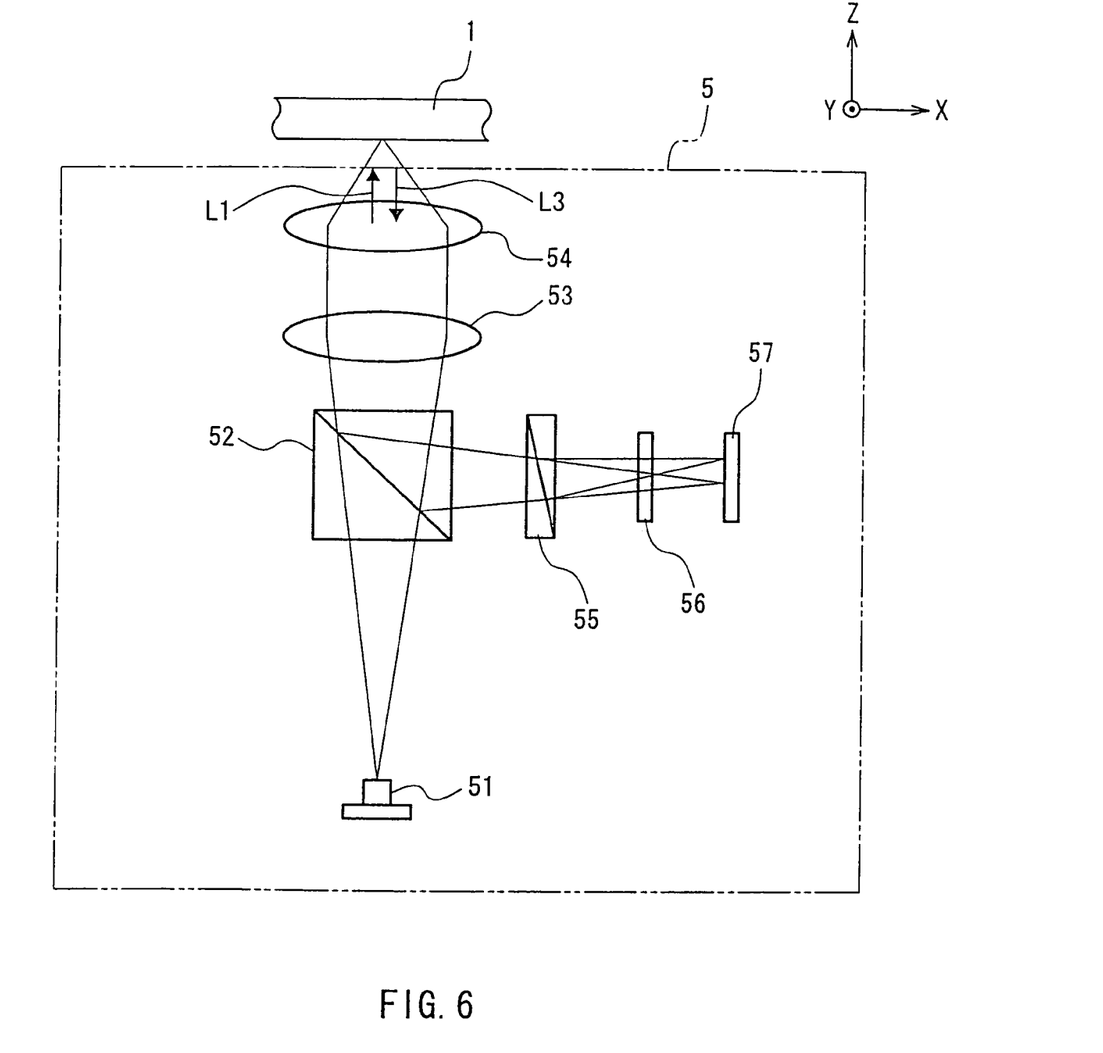
FIG. 6 is a schematic diagram showing the configuration of an optical head device in Embodiment 4 of the present invention.

The following is an explanation of another embodiment of an optical head device of the present invention. FIG. 6 shows an optical head device 5 of this embodiment when used for reproducing information from the optical recording medium 1. For convenience, the lateral direction of the sheet of this drawing is identified as an X-direction, the vertical direction from the sheet surface is identified as a Y-direction, and the longitudinal direction of the sheet is identified as a Z-direction.

A semiconductor laser 51 (a radiation light source) radiates linearly polarized light that is polarized in the X-direction (a first direction). A laser beam L1 emitted from the semiconductor laser 51 enters a polarization beam splitter 52. The polarization beam splitter 52 has the functions of dividing the light polarized in the X-direction into transmission and reflection at a desired ratio (e.g., a transmittance of 80% and a reflectance of 20% in this embodiment) and reflecting all the light polarized in the Y-direction (a second direction). The laser beam L1 passing through the polarization beam splitter 52 is converted into parallel light by a collimator lens 53 and focused to the inside of the optical recording medium 1 by an objective lens 54. The optical recording medium 1 has the structure as shown in FIGS. 1 and 2. Reflected light L3 that is reflected from the optical recording medium 1 again passes through the objective lens 54 and the collimator lens 53, and then enters the polarization beam splitter 52, where 20% of the light polarized in the X-direction is reflected and all the light polarized in the Y-direction is reflected. The light reflected from the polarization beam splitter 52 further enters a Wollaston prism (a polarizing prism) 55 that serves as a polarization separation optical system, and then is divided into the component polarized in the X-direction (a first polarized component) and the component polarized in the Y-direction (a second polarized component).

The component polarized in the Y-direction that has been separated by the Wollaston prism 55 is detected in a light-receiving region of a photodetector 57 and converted into a reproduction signal. The component polarized in the X-direction that has been separated by the Wollaston prism 55 is detected in a plurality of light-receiving regions of the photodetector 57 and converted into servo signals. In this configuration, the photodetector 57 is used for a reproduction signal as well as a servo signal.

As described above, the optical head device 5 of this embodiment can separate the component that represents recorded information from the reflected light and perform super-resolution reproduction with improved S/N.

Embodiment 5

An example of an optical information processing apparatus of the present invention will be described below.

Figure 7:
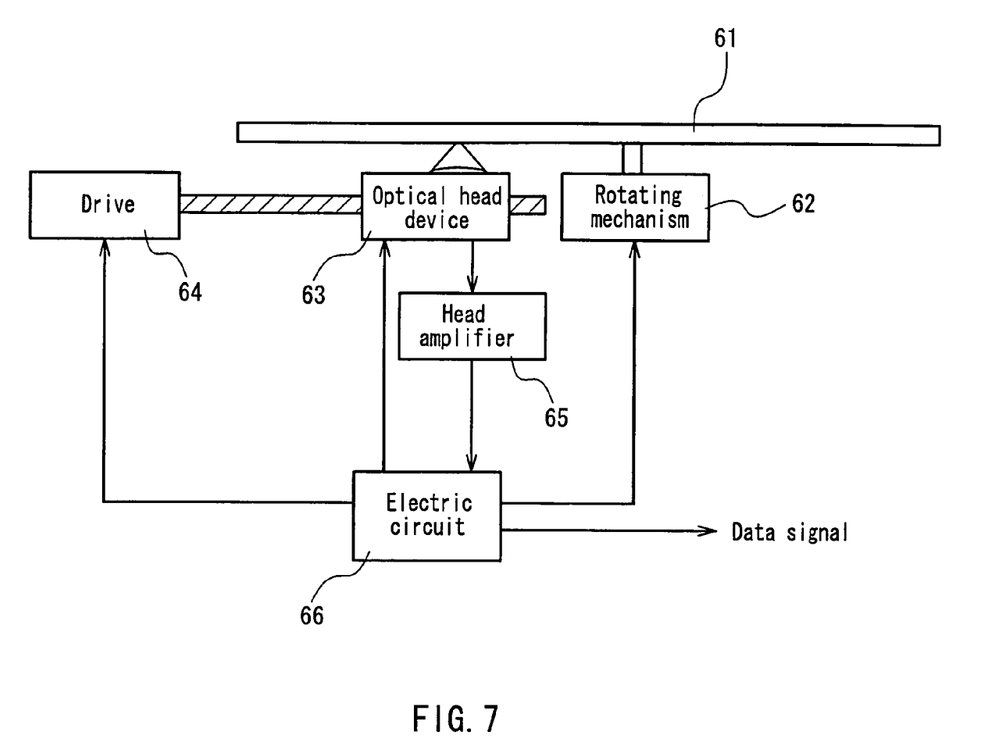
FIG. 7 is a schematic diagram showing the configuration of an optical information processing apparatus in Embodiment 5 of the present invention.

FIG. 7 shows the schematic configuration of an optical information processing apparatus of this embodiment. An optical disk 61 is a disk-shaped optical recording medium and is rotated by a rotating mechanism 62. The optical disk 61 has the same configuration as the optical recording medium 1 used in Embodiments 1 to 4. An optical head device 63 may be any one of the optical head devices 2 to 5 in Embodiments 1 to 4 and has a fine adjustment means for an objective lens. A drive 64 moves the optical head device 63 to a track of the optical disk that contains desired information. The optical head device 63 transmits a focus error signal or tracking error signal to an electric circuit 66 in accordance with the positional relationship between the optical head device 63 and the optical disk 61. In response to these signals, the electric circuit 66 transmits a signal for finely adjusting the objective lens to the optical head device 64. Upon receiving the signal, the optical head device 64 performs focus servo and tracking servo on the optical disk 61 so that information is read, written, or erased with respect to the optical disk 61. The electric circuit 66 also has the functions of adjusting the intensity of a laser beam to optimize a reproduction signal and controlling the size of an aperture formed in the mask layer of the optical disk 61.

This configuration allows the optical information processing apparatus to perform super-resolution reproduction with improved S/N.

In Embodiment 1 to 4, a Sb film is used as the mask layer 13 of the optical recording medium 1. However, the mask layer 13 is not limited thereto, and may be made of a material whose optical properties are changed reversibly in accordance with light intensity. For example, silver oxide, a semiconductor (including elements such as Si and Ge), chalcogenide glass, and a thermochromic material also can be used. Moreover, $Ge_{30}Sb_{15}Te_{55}$ is used as the recording layer 15. However, the recording layer 15 is not limited thereto, and may be made of a material (e.g., various organic dyes or chalcogenide glass) that can record/reproduce information by light. The recording layer 13 can be a reflection film on which information is recorded beforehand in concave-concave form.

The invention claimed is:

1. An optical information reproducing method for reproducing information from an optical recording medium,
  the optical recording medium comprising:
    a recording layer containing the information; and
    a mask layer that is located close to the recording layer and includes a nonlinear optical material whose optical properties are changed in accordance with incident light intensity,
  the method comprising:
    irradiating the optical recording medium with convergent light that is polarized in a first direction;
    forming an optical property changing region in a portion of a region of the mask layer that is exposed to the convergent light;
    irradiating the recording layer with light passing through the optical property changing region;
    dividing reflected light from the optical recording medium into a first polarized component that is polarized in the first direction and a second polarized component that is polarized in a second direction perpendicular to the first direction; and
    detecting a reproduction signal by using the second polarized component.

2. The method according to claim 1, wherein the nonlinear optical material is at least one selected from the group consisting of antimony, silver oxide, a semiconductor, chalcogenide glass, and a thermochromic material.

3. The method according to claim 1, wherein a servo signal is detected by using the first polarized component that is separated from the reflected light from the optical recording medium.

4. An optical head device for reproducing information from an optical recording medium,
  the optical recording medium comprising:
    a recording layer containing the information; and
    a mask layer that is located close to the recording layer and includes a nonlinear optical material whose optical properties are changed in accordance with incident light intensity,
  the optical head device comprising:
    a radiation light source for radiating light that is polarized in a first direction;
    a focusing optical system for converging the light emitted from the radiation light source on the optical recording medium to form a tiny spot;
    a polarization separation optical system for dividing reflected light from the optical recording medium into a first polarized component that is polarized in the first direction and a second polarized component that is polarized in a second direction perpendicular to the first direction; and
    a photodetector for detecting a reproduction signal by receiving the second polarized component separated by the polarization separation optical system.

5. The optical head device according to claim 4, wherein the polarization separation optical system comprises a polarization beam splitter that transmits all the first polarized component and reflects all the second polarized component or a polarization beam splitter that reflects all the first polarized component and transmits all the second polarized component.

6. The optical head device according to claim 4, wherein the polarization separation optical system comprises a diffraction element that diffracts all the first polarized component and transmits all the second polarized component.

7. The optical head device according to claim 4, wherein the polarization separation optical system comprises a polarizing prism that separates the first polarized component from the second polarized component.

8. The optical head device according to claim 4, further comprising a servo signal photodetector that detects a servo signal by receiving the first polarized component separated by the polarization separation optical system.

9. An optical information processing apparatus comprising:
  an optical recording medium; and
  an optical head device,
  the optical recording medium comprising:
    a recording layer containing information; and a mask layer that is located close to the recording layer and includes a nonlinear optical material whose optical properties are changed in accordance with incident light intensity, the optical head device comprising:

a radiation light source for radiating linearly polarized light that is polarized in a first direction;

a focusing optical system for converging the light emitted from the radiation light source on the optical recording medium to form a tiny spot;

a polarization separation optical system for dividing reflected light from the optical recording medium into a first polarized component that is polarized in the first direction and a second polarized component that is polarized in a second direction perpendicular to the first direction; and a photodetector for detecting a reproduction signal by receiving the second polarized component separated by the polarization separation optical system.

10. The optical information processing apparatus according to claim 9, wherein the nonlinear optical material is at least one selected from the group consisting of antimony, silver oxide, a semiconductor, chalcogenide glass, and a thermochromic material.

11. The optical information processing apparatus according to claim 9, wherein the polarization separation optical system comprises a polarization beam splitter that transmits all the first polarized component and reflects all the second polarized component or a polarization beam splitter that reflects all the first polarized component and transmits all the second polarized component.

12. The optical information processing apparatus according to claim 9, wherein the polarization separation optical system comprises a diffraction element that diffracts all the first polarized component and transmits all the second polarized component.

13. The optical information processing apparatus according to claim 9, wherein the polarization separation optical system comprises a polarizing prism that separates the first polarized component from the second polarized component.

14. The optical information processing apparatus according to claim 9, further comprising a photodetector that detects a servo signal by receiving the first polarized component separated by the polarization separation optical system.

* * * * *